US008495717B1

(12) United States Patent
Beacham et al.

(10) Patent No.: US 8,495,717 B1
(45) Date of Patent: Jul. 23, 2013

(54) SECURE KEY DISTRIBUTION SERVICE

(75) Inventors: Jacob Beacham, Seattle, WA (US); Jesper M. Johansson, Woodinville, WA (US); Cyrus Durgin, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 678 days.

(21) Appl. No.: 12/429,494

(22) Filed: Apr. 24, 2009

(51) Int. Cl.
*H04L 29/06* (2006.01)
(52) U.S. Cl.
USPC ....... 726/7; 726/6; 726/30; 709/230; 380/279
(58) Field of Classification Search
USPC ........ 726/7, 6, 27–30; 380/277–279; 709/230
See application file for complete search history.

(56) References Cited

U.S. PATENT DOCUMENTS

| 7,797,724 | B2 * | 9/2010 | Calvin | 726/1 |
| 7,954,139 | B1 * | 5/2011 | Hall | 726/5 |
| 2003/0005157 | A1 * | 1/2003 | Chung et al. | 709/245 |
| 2004/0003287 | A1 * | 1/2004 | Zissimopoulos et al. | 713/201 |
| 2005/0267978 | A1 * | 12/2005 | Satapati | 709/230 |
| 2006/0242260 | A1 * | 10/2006 | Sakou | 709/217 |
| 2007/0157293 | A1 * | 7/2007 | Shuster | 726/4 |
| 2007/0283028 | A1 * | 12/2007 | Gilroy et al. | 709/230 |

OTHER PUBLICATIONS

Gustafson, D., "Securely Available Credential," Apr. 2004, pp. 1-22 http://tools.ietf.org/html/rfc3760.*
U.S. Appl. No. 12/372,609, filed Feb. 17, 2009, Cyrus J. Durgin, Pratik S. Dave, and Eric J. Martin, Distributed Encryption Management.

\* cited by examiner

*Primary Examiner* — Jung Kim
*Assistant Examiner* — Carlos M De Jesus, Jr.
(74) *Attorney, Agent, or Firm* — Lee & Hayes, PLLC

(57) ABSTRACT

A secure key distribution server (SKDS) determines identity of a requesting server without use of a shared secret by resolving the fully qualified domain name (FQDN) to a network address and comparing it with the network address of a key request. A credential string may also be used as part of the identification. Once identity is established, keys may be securely distributed. The SKDS may also be implemented in a peer-to-peer configuration.

21 Claims, 8 Drawing Sheets

SECURE KEY DISTRIBUTION SERVICE

BACKGROUND

Distribution of encryption keys or other small parcels of sensitive data in a secure fashion has traditionally proved difficult. One of the difficulties arises from the problem of identifying valid devices which are allowed to receive the sensitive data. Without proper identification, sensitive data may be provided to an unauthorized or otherwise undesired device. Typically, this identification has either been insecure with minimal overhead, or secure but incurring significant operational overhead setting up the trust relationship a priori. This overhead increases where a data center incorporates multiple teams or groups each with their own requirements. In constantly changing and expanding server environments such as data centers, insecurity may lead to compromise of a server while more secure identification methods may prohibitively increase operational overhead.

Thus, there is a need to distribute keys or other small parcels of sensitive data in a dynamic server environment while minimizing operational overhead.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 8 is a flow diagram of an illustrative process of determining what keys a requesting server has access to.

DETAILED DESCRIPTION

Overview

Figure 1:
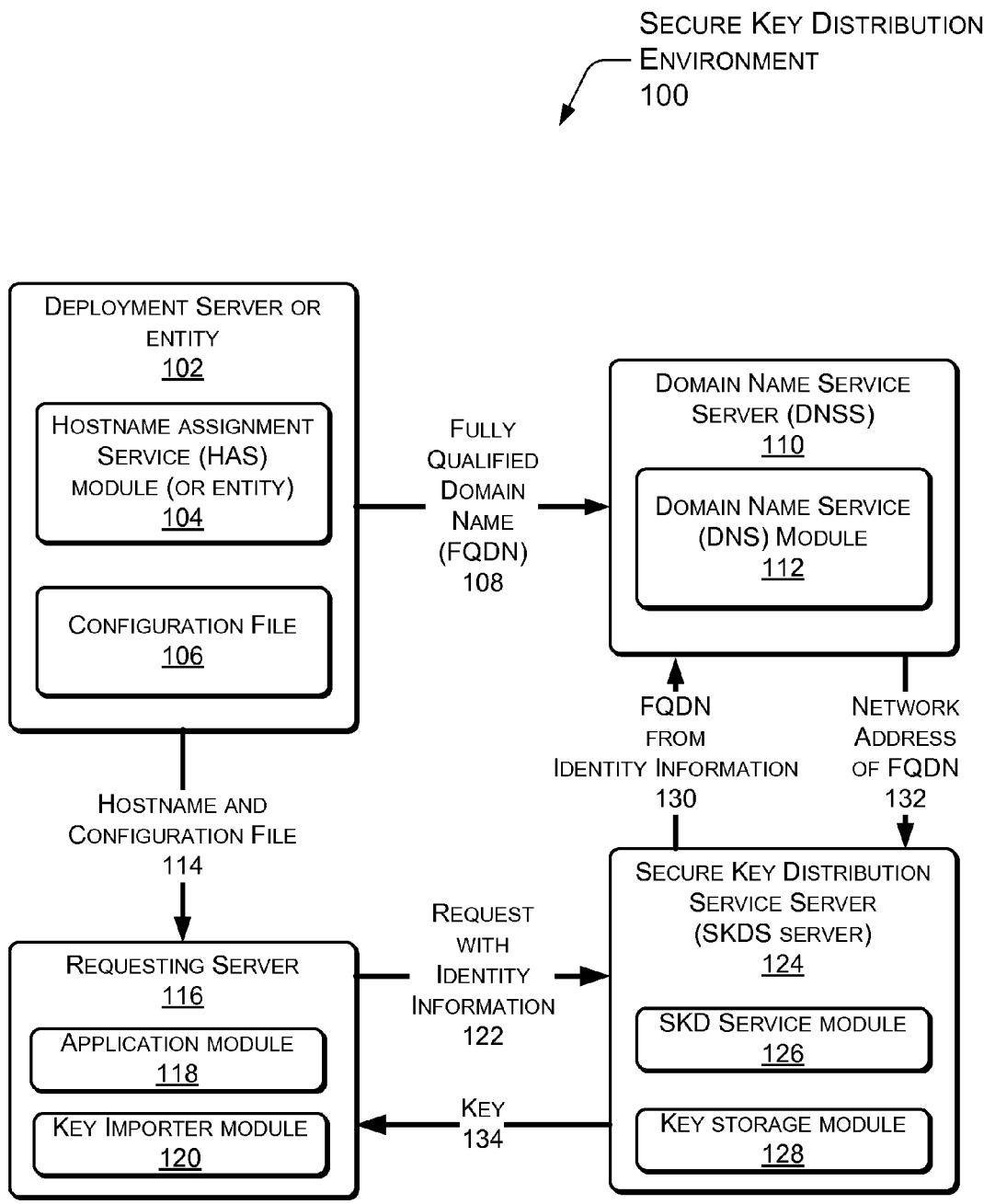
FIG. 1 is a schematic of an illustrative secure key distribution (SKD) environment.

As described above, determining the identity of a device on a network has proven problematic. Before sending sensitive data to a recipient device, it is typically desired to identify the recipient device to ensure that the recipient device is permitted to have the sensitive data.

As used in this application, a device may be a server, client, router, or other computing device. For simplicity in description but not as a limitation, devices are referred to as "servers" in some of the implementations described in this application.

Sensitive data includes encryption keys, configuration data, access control lists, etc. For simplicity in description but not as a limitation, in some instances sensitive data is described in the context of a "key" in this application.

In the dynamic environment of a data center, which may contain thousands of physical or virtual servers on a network, traditional solutions of identification impose undesirable administrative and operational loads. Quite simply, it becomes too difficult and/or expensive to handle the identification of servers and distribution of keys, particularly initial distribution during deployment of a server on the network.

This disclosure describes a secure key distribution service (SKDS) that minimizes the time and expense of validating servers on a network. As described above, "key" or "keys" may refer to encryption keys or other small parcels of sensitive data. The SKDS leverages the controlled nature of server setup in a network to aid in the establishment of identity, which is then used to distribute sensitive information. During setup, a hostname, such as a fully qualified domain name (FQDN), is assigned to the server. The FQDN is registered with a directory service such as a domain name service (DNS) or lightweight directory access protocol (LDAP). For simplicity in description but not as a limitation, the directory service is referred to as a "DNS" in this application.

Information entered into the DNS for a new host server is considered relatively trustworthy because the new host is setup with the network within a specified time period. The underlying network protocols are also assumed to be reasonably secure. For example, transmission control protocol (TCP) of the internet protocol (IP) is considered to be reasonably secure from "spoofing," particularly in a network environment such as a data center. "Spoofing" occurs when a legitimate network address is hijacked and the hijacker pretends to be the hijacked server. However, spoofing has proven to be very difficult to accomplish except in very special circumstances.

Using these assumptions, the SKDS provides for identification of a host and distribution of a key without requiring a pre-shared secret. Removing the requirement for a pre-shared secret removes the complexity and traditionally manual steps involved in that shared secret exchange. Instead, a request is sent from the server to the SKDS. The request includes identification information, which comprises the FQDN of the requesting server, the network address derived from the request packet itself, and a credential string from the requesting server. The SKDS resolves the FQDN to a network address and compares this resolved network address with the network address in the request packet. In one implementation, when the network address from the request packet matches the resolved network address, identity is affirmed. As used in this application, "match" may be an equality, an equivalence, substantial correspondence, or other specified mapping between data. For example, a network address using Internet Protocol version 4 which is equivalent to a network address using Internet Protocol version 6 is a match.

In another implementation, the credential string may also be compared. Thus, in addition to the comparison between network addresses, when the credential string matches an entry in a credential map used by the SKDS, identity is affirmed. This provides additional identity assurance. The credential map comprises a dynamic binding of credential strings for established identities mapped to principals (hostnames). The credential map may be manually or automatically populated. Automatic population of the credential map further minimizes manual intervention.

Secure Key Distribution Environment

FIG. 1 is a schematic of an illustrative secure key distribution (SKD) environment 100. Shown at 102 is a deployment server or entity configured to assist in the provisioning and/or deployment of servers or other computing devices. This deployment server or entity may be automated in the case of an automated deployment system utilizing deployment servers, or manual in the case of a person who handles a deployment with or without the aid of an automated deployment system. For clarity, in the remainder of the application, deployment server 102 is described as an automated system with automated components. However, in other implementations any or all of these components may be implemented manually.

Deployment server 102 includes a hostname assignment service (HAS) module or entity shown at 104. HAS 104 may include a module configured to provide hostnames or be a manual process wherein a person assigns a hostname to a requesting server to be deployed. Deployment server 102 may also generate a configuration file for use by a server during deployment to configure the deployed server for communication with the SKDS.

During deployment, deployment server 102 provides the FQDN to a domain name service server (DNSS) 110. DNSS 110 includes a domain name service (DNS) module 112. DNSS 110 may include the domain name system described in Internet Engineering Task Force Request for Comments documents RFC 1034 and RFC 1035, LDAP, or any other directory service configured to resolve an assigned hostname to a network address. DNS module 112 may be configured to respond to requests for resolution of a name to a network address, and may otherwise maintain the directory of servers.

As part of the deployment process, deployment server 102 provides 114 the FQDN 108 and configuration file 106 to the requesting server 116, which is being deployed. Requesting server 116 may include an application module 118 configured to execute applications on the server and a key importer module 120 configured to request and accept keys on the server.

The key importer module 120 may be configured with information from the configuration file 106. This configuration file 106 may include a list of available SKDS servers (SDKSS) 124. Key importer module 120 may then proceed to request keys from the SKDS server 124 to import. In one implementation, the SKDS server 124 may trigger a request 122 from the requesting server to allow for a "push" of updated key information.

A request with identity information 122 is sent from requesting server 116 to SKDS server 124. This request may be sent using secure hypertext transport protocol (HTTPS) or other protocol to prevent the identity information from being sent as clear text across the network. This identity information 122 may include a FQDN and the network address of requesting server 116, and is described in more detail in FIG. 2 below.

SKDS server 124 includes a SKD service module 126 configured to receive requests and a key storage module 128 configured to retrieve keys as permitted. SKD service module 126 sends 130 the FQDN present in the identity information 122 to DNS 110 for resolution. DNS 110 is presumed to be trustworthy, resolves the FQDN to a network address, and returns this network address 132 to SKDS 124.

SKD Service module 126 may then compare the network address of the request 122 with the resolved network address 132. This provides a simple and reasonably secure method of establishing an identity because of the trustworthy nature of the name server which resolves the network address 132. When there is a match, the SKD service module 126 retrieves a key (or keys) from the key storage module 128, and returns the key 134 to the requesting server 116. As describe above with respect to the request 122, the key 134 may be transmitted using HTTPS to prevent the key information from being sent as clear text across the network. Key importer module 120 may then import and store key 134 for use by the requesting server 116. In one implementation, communications secured with key 134 from requesting server 116 are now possible.

Figure 2:
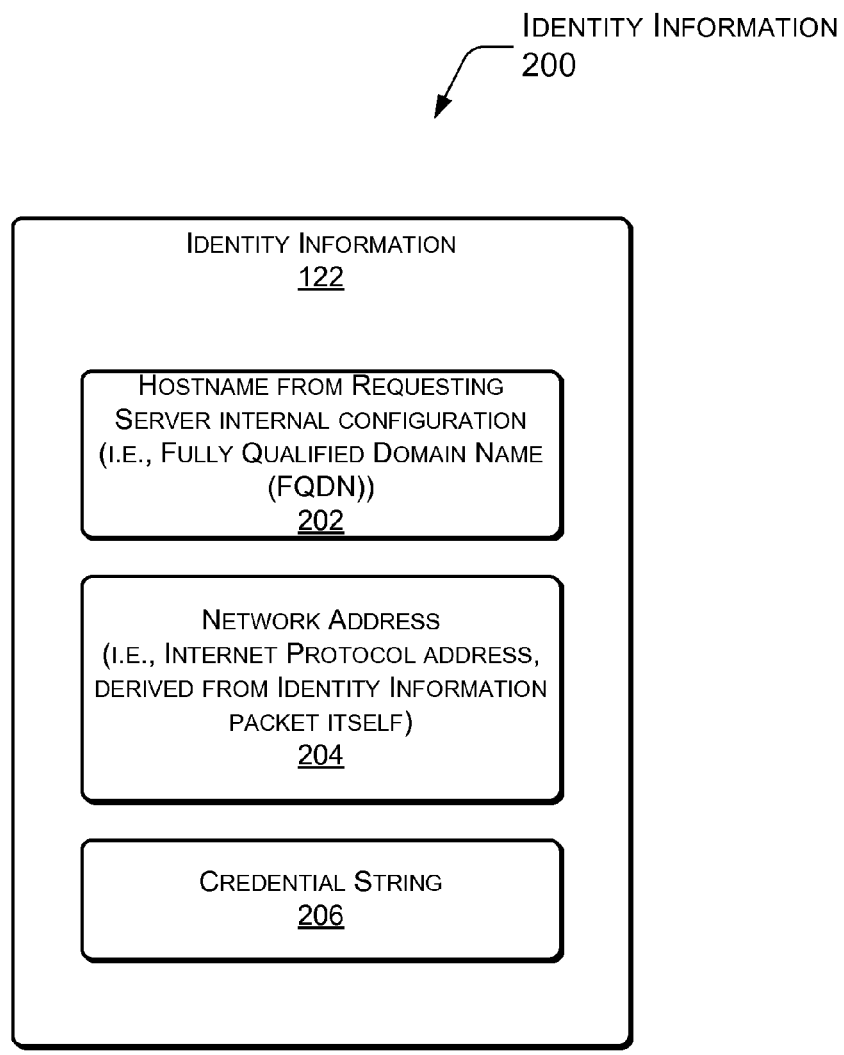
FIG. 2 is a schematic of illustrative identity information used in the SKD environment of FIG. 1.

FIG. 2 is a schematic of illustrative identity information 200 used in the SKD environment of FIG. 1. Identity information 122 may include a hostname 202, network address 204, and credential string 206. Hostname 202 may be a FQDN, or other naming convention used to designate a specific server on the network. Hostname 202 is taken from the internal configuration of the requesting server 116. Network address 204 may be the internet protocol (IP) address or other network address as defined by the networking protocol in use. Network address 204 may be derived from the packet information containing the request itself, i.e., a "source" address field, or be explicitly stored as payload within the packet. Credential string 206 may be a string which is generated at the requesting server, as described next in FIG. 3. Credential string 206 makes it more difficult for an attacker to spoof a device because the credential information is not normally exchanged during operation of the requesting server and is not independently derivable or externally assigned.

Key Importer Module

Figure 3:
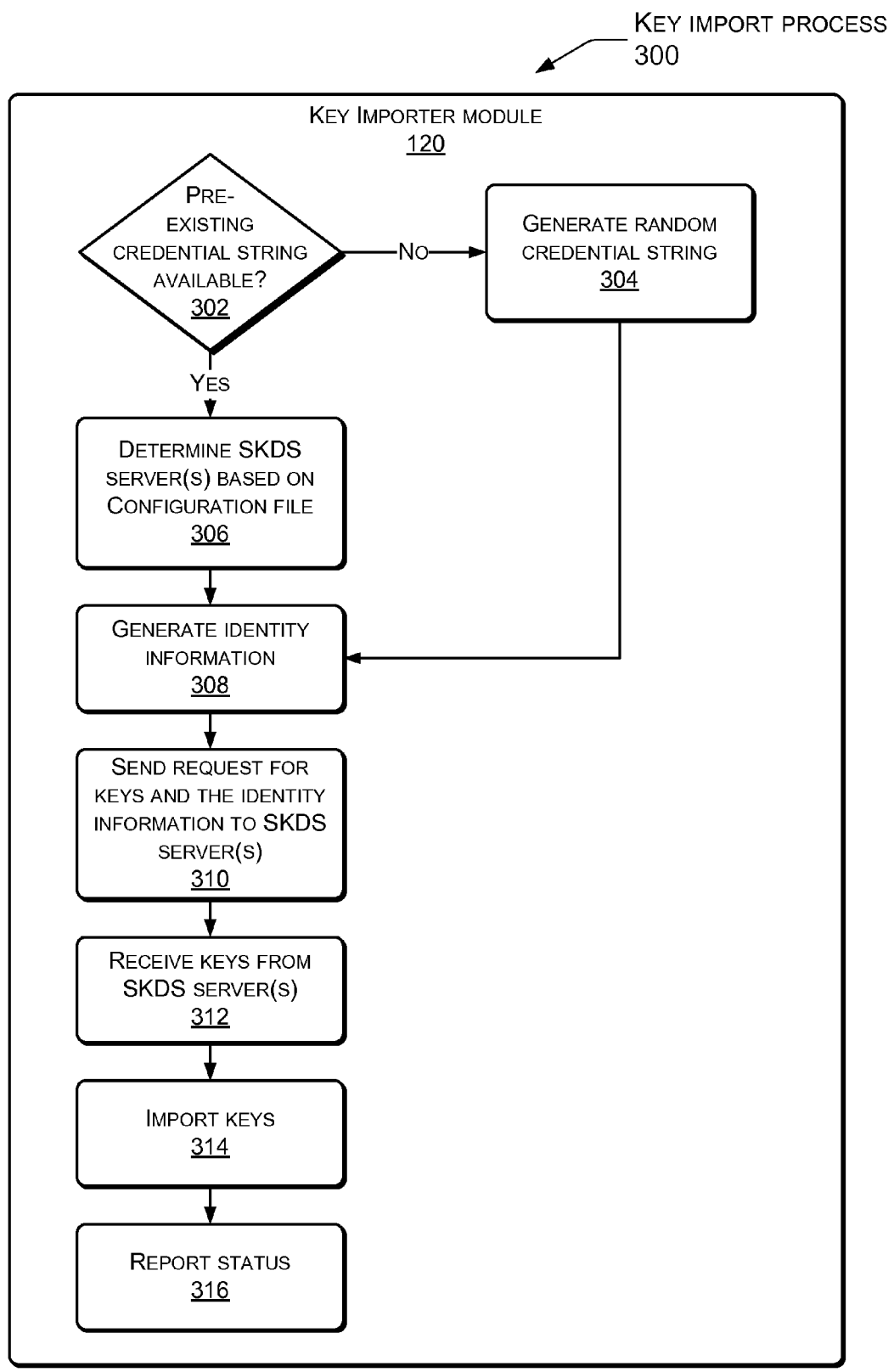
FIG. 3 is a flow diagram of an illustrative key import process.

FIG. 3 is a flow diagram of an illustrative key import process 300 that may, but need not, be implemented using the architecture shown in FIG. 1. The process 300 will be described in the context of the architecture of FIG. 1 for convenience and clarity. This illustrative process may use key importer module 120. Key importer module 120 may, but need not, reside on requesting server 116.

At block 302, the requesting server 116 determines whether a pre-existing credential string is available. At block 304, when no pre-existing credential string is present the requesting server generates a credential string. Credential string generation may incorporate a random or pseudo-random string generation or hash processes. In some implementations, the credential string may be generated or incorporate or both, information derived from the requesting server 116.

At block 306, the requesting server determines which SKDS server(s) are available to fulfill requests based on information in the configuration file provided during or after deployment. In one implementation, the configuration file may itself be updated using the SKDS server where the configuration file is sent instead of an encryption key.

At block 308, the requesting server generates identity information for transmission to the SKDS server. As described above, identity information may include FQDN, network address, and the credential string.

At block 310, the requesting server sends a request for keys and the identity information to the SKDS server indicated in the configuration file. When the SKDS server allows sending of keys, at block 312 the keys from the SKDS server are received. At block 314, the requesting server imports the keys into key storage for use by the requesting server's encryption application. At block 316, the requesting server may report status of the key import to a log file, user, SKDS server, administrative server, etc.

SKD Service Module

Figure 4:
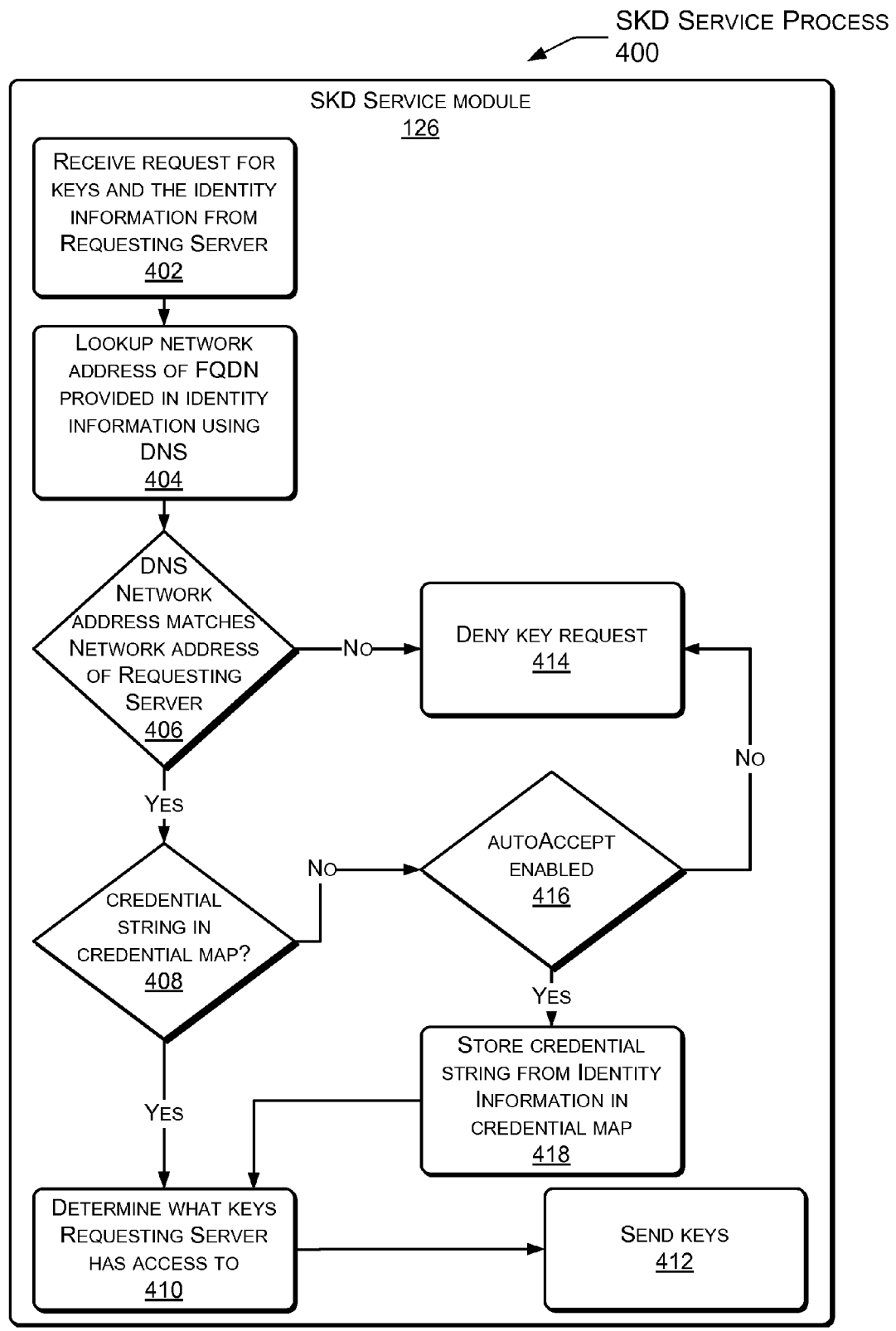
FIG. 4 is a flow diagram of an illustrative SKD service process.

FIG. 4 is a flow diagram of an illustrative SKD service process 400 that may, but need not, be implemented using the architecture shown in FIG. 1. The process 400 will be described in the context of the architecture of FIG. 1 for convenience and clarity. This illustrative process may use SKD service module 126. SKD service module 126 may, but need not, reside on SKDS server 124.

At block 402, the SKDS server receives a request for keys and the identity information sent by a requesting server. At block 404, the SKDS server resolves the FQDN present in the identity information to a network address using DNS. At block 406, the SKDS server compares the resolved network address provided by DNS with the network address provided in the identity information of the requesting server.

When a match is found at block 406, the SKDS server, at block 408, determines if the credential string in the identity information is present within a credential map. When at 408 the credential string is present in the credential map, the SKDS server has established the identity of the requesting server and at block 410 the SKDS server determines what keys the requesting server has access to. Once the SKDS server determines at block 410 what keys the requesting server has access to, at block 412 the SKDS server sends those keys to the requesting server.

Returning to block 406 at the SKDS server, when no match is found between the resolved network address provided by DNS and the network address provided in the identity information of the requesting server, block 414 denies the key request.

Returning to block 408, when the credential string is not present within the credential map, the SKDS server at block 416 may be set to enable automatic acceptance of credential strings. This automatic acceptance may be appropriate in, for example, large data centers or other dynamic deployment environments where manual maintenance of a credential map would prove cumbersome or expensive. Automatic acceptance of credential strings may be considered an acceptable risk when it is assumed that a requesting server is likely to be uncompromised soon after deployment and requests originating outside the datacenter are blocked. This assumption is based on the observation that compromise to a server in a data center is unlikely to occur during initial provisioning Traditionally servers are not compromised until after an operating system is installed, thus an assumption may be made that for a given period of time after starting the deployment, the server is unlikely to be compromised. Later compromise of the requesting server may then be revealed by a request for keys with a credential string differing from that stored in the SKDS server credential map.

When block 416 at the SKDS server is set to enable automatic acceptance of credential strings, block 418 stores the credential string provided in the identity information from the requesting server in the SKDS server credential map, and proceeds to block 410 for determination of what keys the requesting server has access to. When block 416 at the SKDS server is set to deny automatic acceptance of credential strings, block 414 denies the key request for requesting servers that do not have a credential string stored in the credential map. A response indicating this denial may be sent to the requesting server.

Peer-Based Distribution Environment

Figure 5:
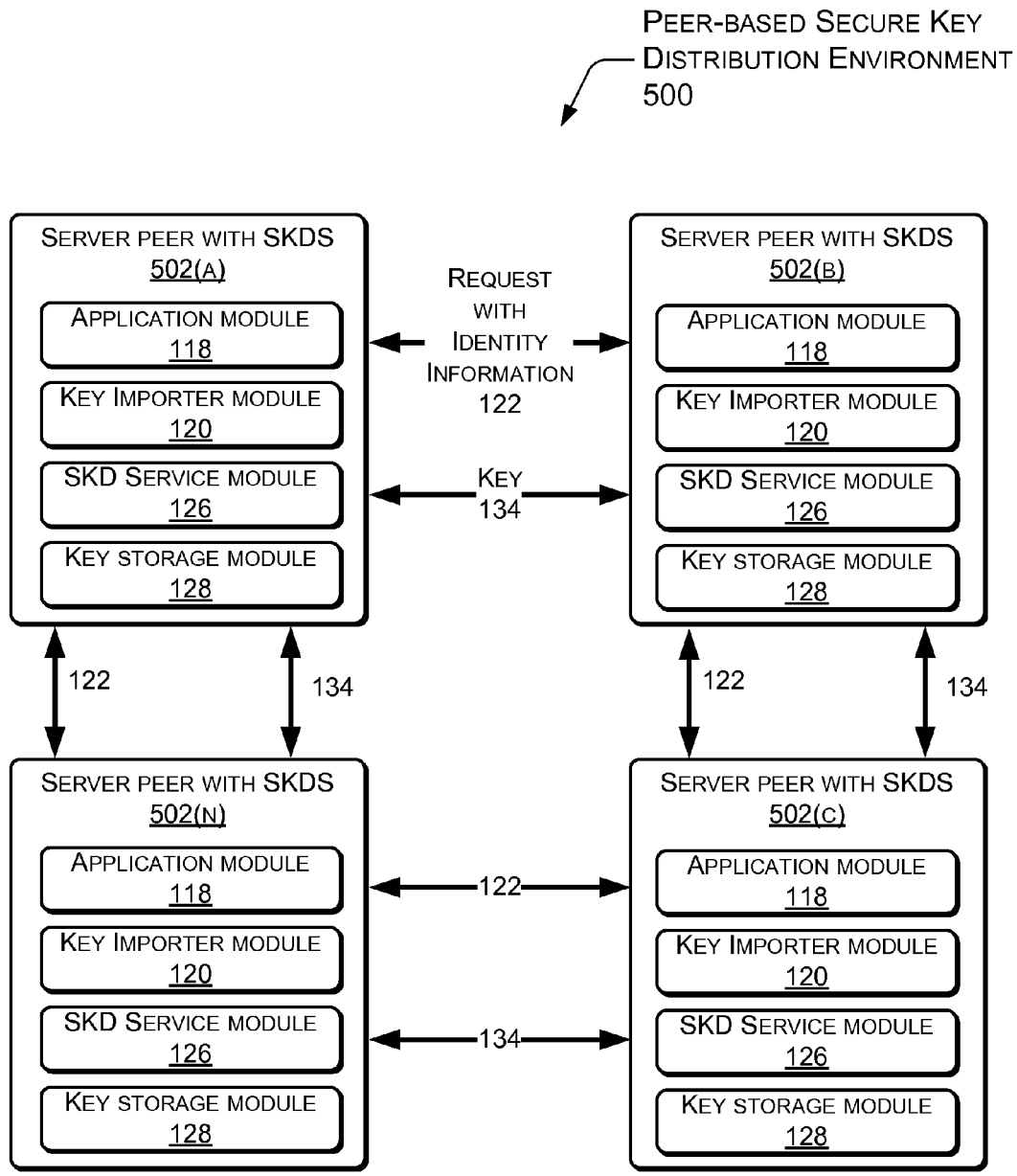
FIG. 5 is a schematic of an illustrative peer-based SKD environment.

FIG. 5 is a schematic of an illustrative peer-based SKD environment 500. Large or distributed environments may benefit from distributed key deployment and accessibility. Such distribution improves reliability and responsiveness of the key distribution system. FIG. 5 depicts server peers with SKDS 502(A) . . . 502(N). Server peers with SKDS 502 may include an application module 118, key importer module 120, SKD service module 126, and key storage module 128.

Server peer 502(A) may send a request for keys with its identity information 122 to server peer 502(B). Server peer 502(B) may process the request as describe above with respect to FIG. 4. When server peer 502(A) is identified, server peer 502(B) may return key 134. When a server peer 502 has newly joined the network, it may build its store of keys through requests to other server peers 502(N). In addition to keys, information exchanged may include updated configurations, lists of current SKDS server, etc. In this fashion, keys are distributed throughout the network to server peers with appropriate access. Control mechanisms such as time to live, number of SKDS servers to interrogate, distances to SKDS servers, etc., may be incorporated to prevent burdensome or infinite network traffic.

Key Handling and Distribution

Figure 6:
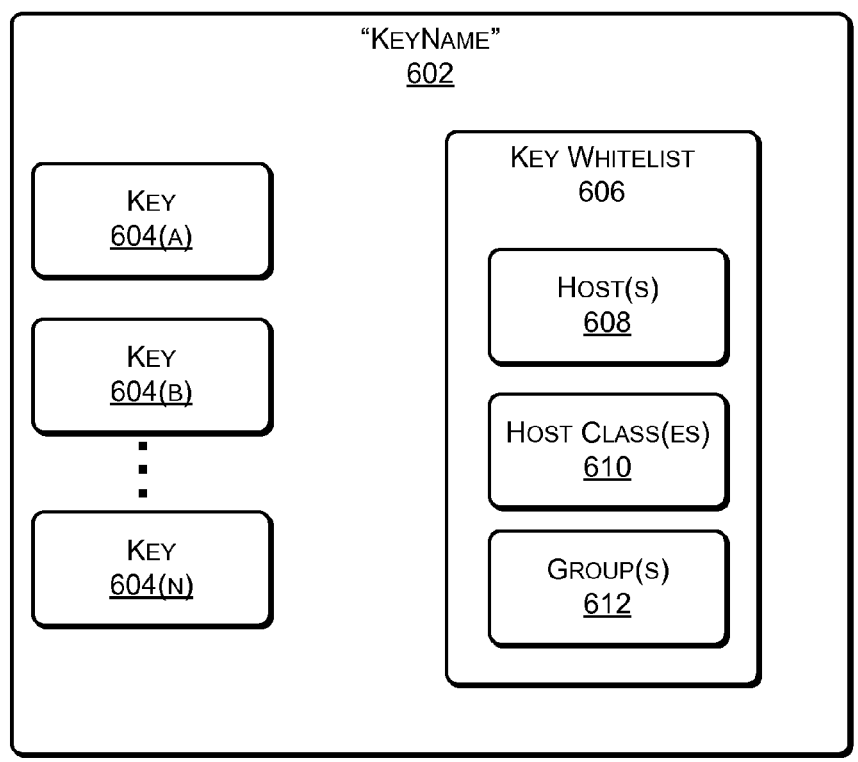
FIG. 6 is a schematic of an illustrative relationship between a key name and a key whitelist which may include hosts, host classes, and groups.

FIG. 6 is a schematic of an illustrative relationship 600 between a keyname and a key whitelist. A key may be configured to incorporate access information. This prevents inadvertent release of keys to unauthorized hosts. FIG. 6 also illustrates the benefit of minimizing the complexity of maintaining this mapping. Keyname 602 identifies the key and may incorporate multiple keys 604(A) . . . 604(N). For example, these keys 604 may be keys with different serial numbers. The configuration file or store state of keyname 602 may include key whitelist 606. Within key whitelist 606 may be a list of individual hosts 608, host classes 610, or groups 612, which are permitted access to this key. A host class is a grouping of hosts, and may be maintained by a trusted centralized authority such as DNS or LDAP. In this way, various levels of access granularity may be achieved. For example, a key whitelist for keyname "testkey" may contain several entries: First, a host entry designates host "server1.site.com" as having access to the "testkey" key. Second, a host class entry indicates that members of host class "PRODUCTION" have access to the "testkey" key. Third, a group entry may indicate that servers which are members of the group "SECURED" have access to the "testkey" key. Thus, servers not enumerated in the host entry, but which are members of the "PRODUCTION" host class or "SECURED" group would also have access to this key.

Figure 7:
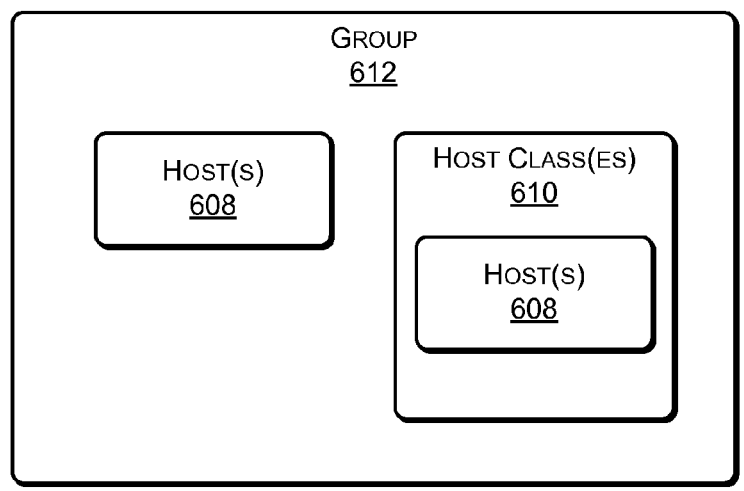
FIG. 7 is a schematic of an illustrative composition of the group from FIG. 6.

FIG. 7 is a schematic of an illustrative composition of a group. Hosts may be aggregated into groups for ease of administration and to simplify management in complex environments. For example, servers which are in test or pre-production release status may be members of a "TEST" group. Each group 612 may include a list of individual hosts 608 and host classes 610. As described above, host classes 610 may further incorporate a list of individual hosts 608. Thus, a group "SECURED" may include a specific host "testserver1.site.com" as well as a "TESTSERVER" host class. Other test servers which are members of the TESTSERVER host class would then have access to this key.

Figure 8:
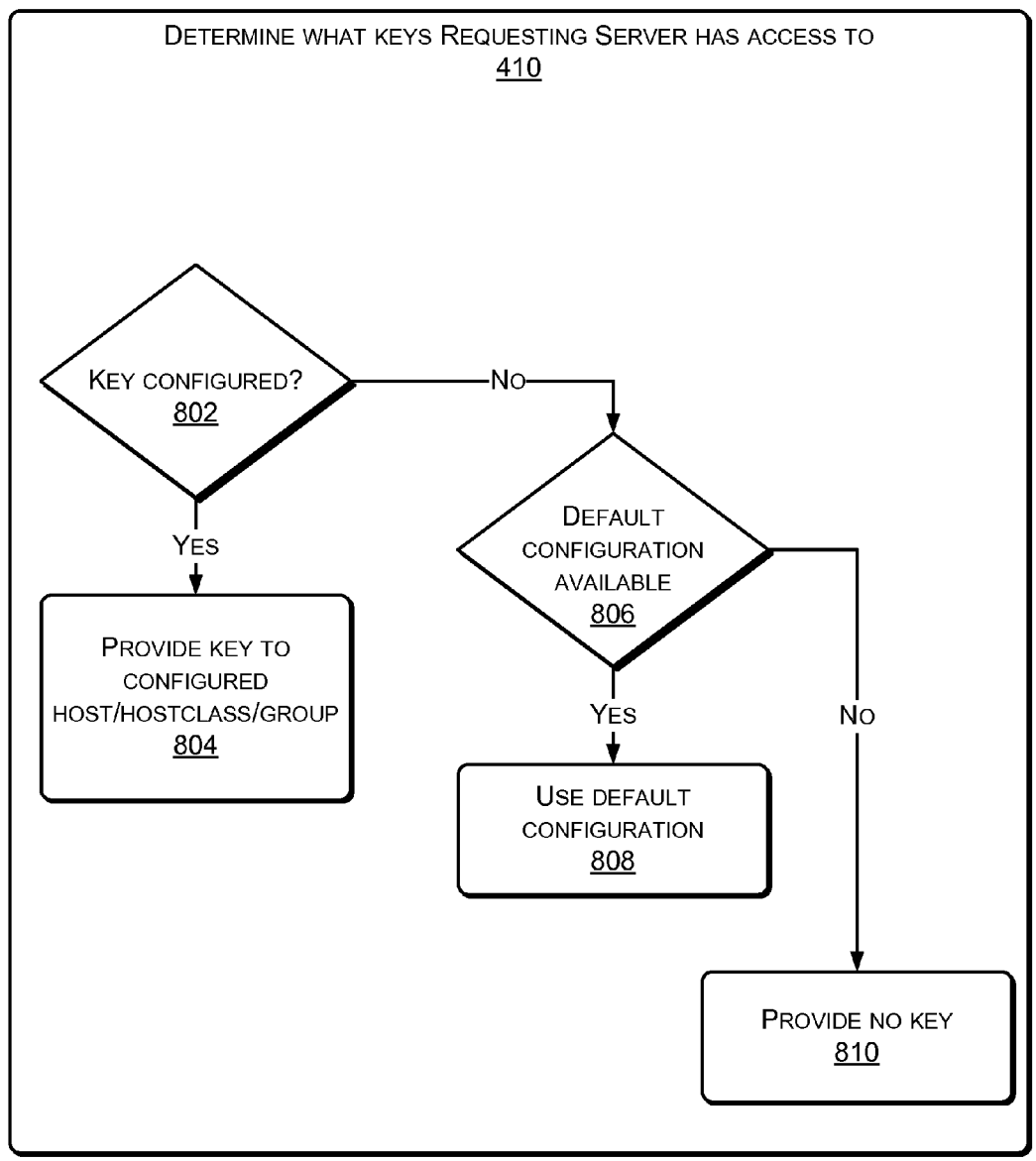

FIG. 8 is a flow diagram of an illustrative process 800 of determining what keys a requesting server has access to. The process 800 may, but need not, be implemented using the architecture shown in FIG. 1. The process 800 will be described in the context of the architecture of FIG. 1 for convenience and clarity. This illustrative process may use SKD service module 126. SKD service module 126 may, but need not, reside on SKDS server 124.

At block 802, the SKDS server determines if the key is configured to be accessible to specified hosts. This configuration includes the hosts incorporated through the key whitelist 606 for each keyname 602. At block 804, the SKDS server provides the keys to a host which is listed in the configuration, when that configuration is available at block 802. When no configuration is available at block 802, at block 806 the SKDS server determines if a pre-determined default configuration is available. For example, a default configuration may include providing access to a default key. When a default configuration is available, at block 808 the SKDS server uses that default configuration. Thus, pre-defined alternate secure data such as a key is provided when the requested data is unavailable. When no default configuration is available, at block 810 the SKDS server provides no key to the requesting server.

CONCLUSION

Although specific details of illustrative methods are described with regard to the figures, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. A method comprising:
   receiving, by a secure key distribution service (SKDS) server device, identity information from a requesting server device, the identity information comprising a fully-qualified domain name (FQDN) of the requesting server device, a credential string, and a network address of the requesting server device, wherein the credential string includes a hash value and the requesting server device is one of a plurality of server devices of a data center;
   providing, by the SKDS server device, the FQDN to a domain name server device;
   retrieving, by the SKDS server device, from the domain name server device a resolved network address at least partly in response to providing the FQDN to the domain name server device;
   comparing, by the SKDS server device, the network address of the requesting server device with the resolved network address; and
   authorizing, by the SKDS server device, transmission of encryption key information when the network address of the requesting server device matches the resolved network address,
   wherein the SKDS server device, the requesting server device, and the domain name server device are separate and distinct devices.

2. The method of claim 1, wherein the receiving of the identity information and the transmission of the key information occurs via secure hypertext transfer protocol (HTTPS).

3. The method of claim 1, further comprising comparing the credential string from the requesting server device with a previously stored credential string associated with the requesting server device, and
   wherein the transmission of the key information is authorized when the credential string provided by the requesting server device matches the previously stored credential string.

4. The method of claim 3, wherein the credential string is generated by the requesting server device.

5. The method of claim 1, further comprising:
   comparing the credential string from the requesting server device with a credential map of previously stored credential strings, and
   wherein the transmission of the key information is authorized when the credential string of the requesting server device is absent from the credential map.

6. A method comprising:
   receiving, by a server device, identity information from a requesting server device, the identity information including a fully qualified domain name (FQDN), a credential string, and a network address of the requesting server device;
   retrieving, by the server device, from a directory service server device a resolved network address associated with the identity information received from the requesting server device;
   comparing, by the server device, the network address of the requesting server device with the resolved network address; comparing, by the server device, the credential string received from the requesting server device with a credential map of previously stored credential strings;
   determining, by the server device, that the credential string is absent from the credential map based at least in part on the comparing the credential string with the credential map;
   determining, by the server device, whether automatic acceptance of credential strings is enabled at least partly in response to determining that the credential string is absent from the credential map;
   determining, by the server device, one or more keys that are accessible to the requesting server device based, at least in part, on a key whitelist; and
   authorizing, by the server device, transmission of a key when the network address of the requesting server device matches the resolved network address and when the automatic acceptance of credential strings is enabled,
   wherein the server device, the requesting server device, and the directory service server device are separate and distinct devices.

7. The method of claim 6, wherein the network address comprises an internet protocol (IP) address.

8. The method of claim 6, wherein the automatic acceptance of credential strings is enabled for a particular period of time.

9. The method of claim 6, wherein the directory service server device comprises a domain name server (DNS) or a lightweight directory access protocol (LDAP).

10. The method of claim 8, wherein the particular period of time includes a period of time after starting the deployment of the requesting server device.

11. The method of claim 6, wherein the key comprises an encryption key.

12. The method of claim 6, further comprising:
    comparing an additional credential string received from an additional requesting server device with the credential map and
    authorizing transmission of a particular key when a network address of the additional requesting server device matches an additional resolved network address and when the additional credential string matches a corresponding credential string in the credential map.

13. The method of claim 6, wherein the requesting server device generates the credential string.

14. The method of claim 13, further comprising automatically incorporating the credential string of the requesting server device into the credential map when the credential string of the requesting server device is absent from the credential map.

15. A system comprising:
- a server comprising a memory and a communication device coupled to a processor, the communication device coupled to a communication network; and
- a service module stored on the memory and configured to:
  - receive identity information and a request for secure data from a requesting server device via the communication network;
  - retrieve from a directory service server device a resolved network address associated with the identity information received from the requesting server device;
  - compare a network address of the requesting server device with the resolved network address;
  - determine a key that is accessible to the requesting server device based, at least in part, on a key whitelist, the key whitelist including a number of individual server devices that are permitted to access the key and an identifier of a group of server devices that are permitted to access the key, wherein the group of server devices is maintained by the directory service server device; and
  - authorize transmission of secure data stored in the memory to the requesting server device when the network address of the requesting server device matches the resolved network address, the secure data including the key that is accessible to the requesting server device,
  - wherein the server, the requesting server device, and the directory service server device are separate and distinct devices.

16. The system of claim 15, wherein the directory service server device comprises a domain name server (DNS) module or a lightweight directory access protocol (LDAP) module.

17. The system of claim 15, wherein the identity information comprises a credential string.

18. The system of claim 17, wherein the service module is configured to accept a credential string self-generated by the requesting server device.

19. The system of claim 15, wherein the network address comprises an internet protocol (IP) address.

20. The system of claim 15, further comprising an access module stored in the memory and configured to provide predefined alternate secure data when the requested secure data is unavailable.

21. The system of claim 15, wherein the requesting server device and the server are configured in a peer-to-peer arrangement.

* * * * *